(12) United States Patent
Terai

(10) Patent No.: US 11,431,009 B2
(45) Date of Patent: Aug. 30, 2022

(54) POWER MANAGEMENT SERVER, POWER MANAGEMENT SYSTEM, AND POWER MANAGEMENT METHOD

(71) Applicant: KYOCERA Corporation, Kyoto (JP)

(72) Inventor: Ryota Terai, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 17/256,175

(22) PCT Filed: Jun. 24, 2019

(86) PCT No.: PCT/JP2019/024931
§ 371 (c)(1),
(2) Date: Dec. 25, 2020

(87) PCT Pub. No.: WO2020/004317
PCT Pub. Date: Jan. 2, 2020

(65) Prior Publication Data
US 2021/0265645 A1 Aug. 26, 2021

(30) Foreign Application Priority Data
Jun. 27, 2018 (JP) .............................. JP2018-121627

(51) Int. Cl.
*H01M 8/04302* (2016.01)
*H01M 8/04303* (2016.01)
*H02J 13/00* (2006.01)
*H01M 8/04701* (2016.01)
(Continued)

(52) U.S. Cl.
CPC ..... *H01M 8/04302* (2016.02); *H01M 8/0494* (2013.01); *H01M 8/04303* (2016.02); *H01M 8/04708* (2013.01); *H02J 3/46* (2013.01); *H02J 13/00028* (2020.01)

(58) Field of Classification Search
CPC ......... H01M 8/04302; H01M 8/04303; H01M 8/04708
See application file for complete search history.

(56) References Cited

U.S. PATENT DOCUMENTS

| | | | |
|---|---|---|---|
| 6,887,606 B2 * | 5/2005 | Parr | H01M 8/2483 429/429 |
| 2017/0207633 A1 * | 7/2017 | Nakayama | H02J 3/383 |
| 2017/0214273 A1 | 7/2017 | Kogo et al. | |

FOREIGN PATENT DOCUMENTS

| | | |
|---|---|---|
| EP | 2882023 A1 | 6/2015 |
| JP | 2005182399 A | 7/2005 |
| JP | 2015126564 A | 7/2015 |

(Continued)

*Primary Examiner* — Olatunji A Godo
(74) *Attorney, Agent, or Firm* — Hauptman Ham, LLP

(57) ABSTRACT

A power management server controls a fuel cell system including a power generator. The power management server includes at least one processor. The processor is configured to execute a reception process and control process. The reception process incudes a reception process of receiving a massage including an information element indicating an operation state of the fuel cell system. The control process includes a control process of controlling the fuel cell system which the operation state is a power generating state, in preference to the fuel cell system which the operation state is a starting up state, stopping state, and stop operating state, in a control target period.

8 Claims, 5 Drawing Sheets

(51) Int. Cl.
*H01M 8/04858* (2016.01)
*H02J 3/46* (2006.01)

(56) References Cited

FOREIGN PATENT DOCUMENTS

| | | |
|---|---|---|
| JP | 201785891 A | 5/2017 |
| JP | WO2016021179 A1 | 5/2017 |
| JP | 201855896 A | 4/2018 |

* cited by examiner

| No. | INFORMATION ELEMENT |
|---|---|
| 1 | POWER GENERATING STATE |
| 2 | STOPPING STATE |
| 3 | STARTING UP STATE |
| 4 | STOP OPERATING STATE |
| 5 | IDLING STATE |

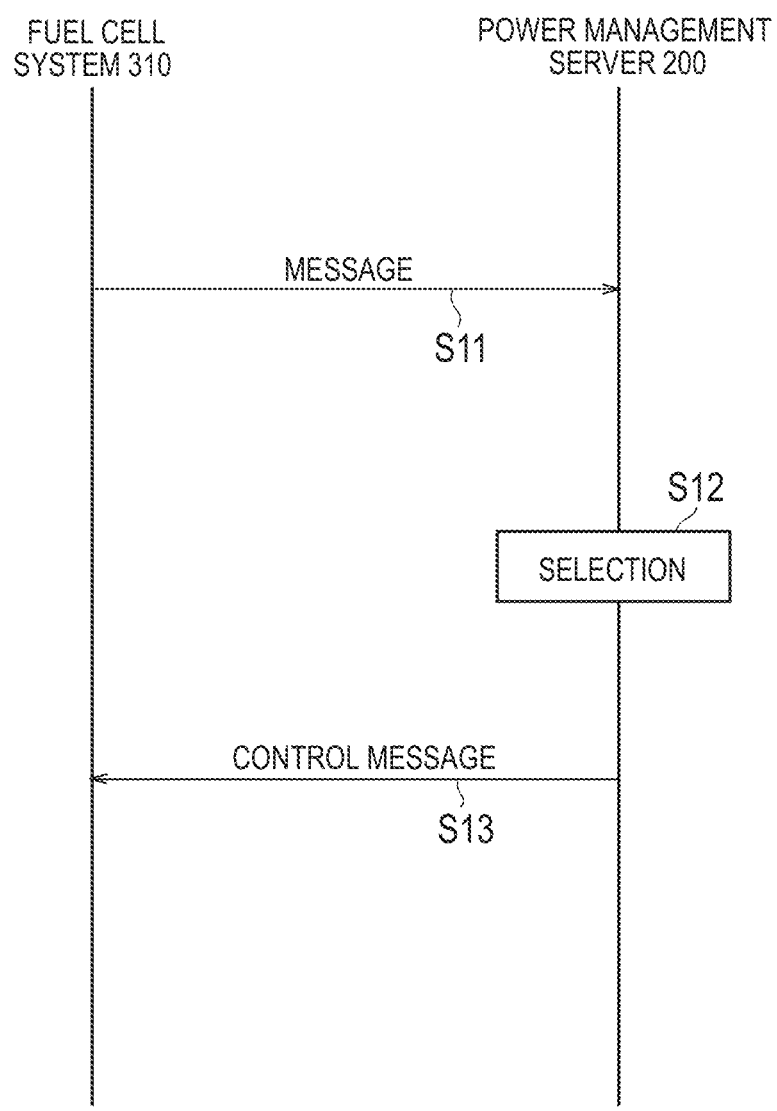

POWER MANAGEMENT SERVER, POWER MANAGEMENT SYSTEM, AND POWER MANAGEMENT METHOD

RELATED APPLICATIONS

The present application is a National Phase of International Application No. PCT/JP2019/024931, filed Jun. 24, 2019, and claims priority based on Japanese Patent Application No. 2018-121627, filed Jun. 27, 2018.

TECHNICAL FIELD

The present invention relates to a power management server, a power management system, and a power management method.

BACKGROUND ART

In recent years, techniques for using a storage battery apparatus as a distributed power supply to maintain the power supply and demand balance of a power grid (for example, a VPP (Virtual Power Plant)) has been known (for example, see Patent Literatures 1, and 2). Further, it is conceivable to use a fuel cell system as the distributed power supply using in the VPP or the like.

CITATION LIST

Patent Literature

Patent Literature 1: Japanese application publication No. 2005-182399

SUMMARY OF THE INVENTION

A power management server according to a first disclosure controls a fuel cell system including a power generator. The power management server includes at least one processor. The processor is configured to execute a reception process and control process. The reception processing includes a reception process of receiving a massage including an information element indicating an operation state of the fuel cell system. The control processing includes a control processing of controlling the fuel cell system which the operation state is a power generating state, in preference to the fuel cell system which the operation state is a starting up state, a stopping state, and a stop operating state, in a control target period for controlling the fuel cell system.

A power management system according to a second disclosure includes a fuel cell system including a power generator and a power management server configured to control the fuel cell system. The power management server a receiver and controller. The receiver is configured to receive a message including an information element indicating an operation state of the fuel cell system. The controller is configured to control the fuel cell system which the operation state is a power generating state, in preference to the fuel cell system which the operation state is a starting up state, stopping state, and stop operating state, in a control target period for controlling the fuel cell system.

A power management method according to a third disclosure includes controlling a fuel cell system including a power generator by a power management server. The controlling the fuel cell system includes receiving a message including an information element indicating an operation state of the fuel cell system by the power management server, and controlling the fuel cell system which the operation state is a power generating state, in preference to the fuel cell system which the operation state is a starting up state, stopping state, and stop operating state, in a control target period for controlling the fuel cell system, by the power management server.

BRIEF DESCRIPTION OF DRAWINGS

FIG. 6 is a diagram illustrating a power management method according to an embodiment.

DESCRIPTION OF EMBODIMENTS

As the fuel cell system described in BACKGROUND ART, a fuel cell system in which a starting up state from a stopping state to a power generating state is long is considered, too. In such the background, as a result of an extensive investigate, inventors have found out that different control than a storage battery apparatus is required when the fuel cell system is used as a distributed power supply of a VPP.

Accordingly, the present disclosure provides a power management server, power management system, and power management method that make it possible to appropriately control a fuel cell system.

A power management server according to the embodiments controls a fuel cell system including a power generator. The power management server includes at least one processor. The processor is configured to execute a reception process of receiving a message including an information element indicating an operation state of the fuel cell system, and a control process of controlling the fuel cell system which the operation state is a power generating state, in preference to the fuel cell system which the operation state is a starting up state, a stopping state, and a stop operating state, in a control target period for controlling the fuel cell system.

By this, it is possible to provide a power management server, power management system, and power management method that make it possible to appropriately control the fuel cell system.

In the following, the embodiments will be described with reference to the drawings. Further, in the following description of the drawings, same or similar parts are marked with same or similar signs.

However, it should be noted that the drawings are schematic and ratios of each dimension may be different from actual dimensions. Therefore, specific dimensions should be determined in consideration of the following description. In addition, it is needless to say that the drawings may include portions having different dimensional relationships or ratios.

[Embodiments]

(Power Management System)

Figure 1:
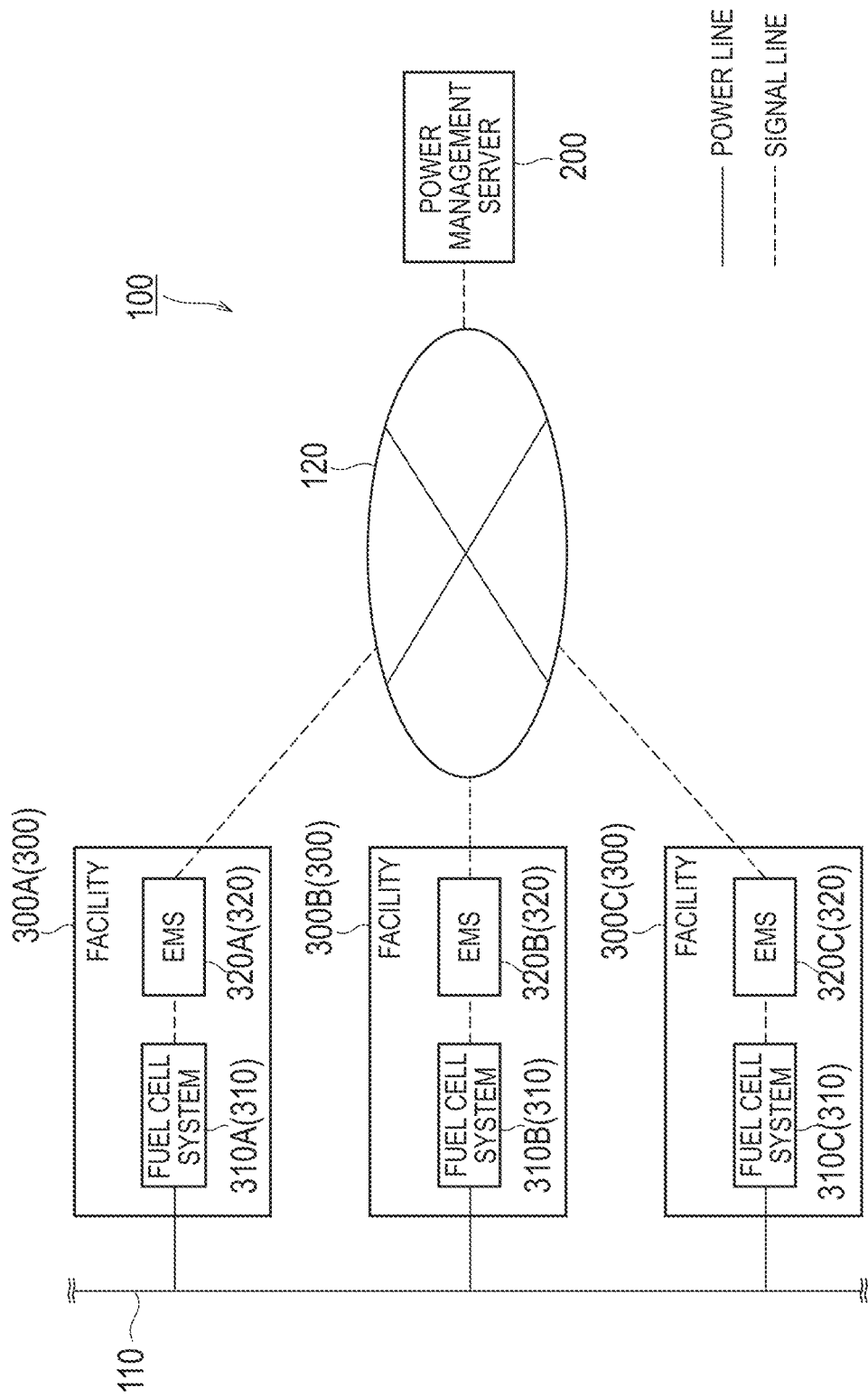
FIG. 1 is a diagram illustrating a power management system 100 according to an embodiment.

In the following, it will be explained about a power management system according to the embodiments. As illustrated in FIG. 1, a power management system 100 includes a power management server 200 and a facility 300. In FIG. 1, as the facility 300, a facility 300A to facility 300C are exemplified.

Each of facilities 300 is connected to a power grid 110. In the following, a flow of power from the power grid 110 to the facility 300 is called as a flow, and a flow of power from the facility 300 to the power grid 110 is called as a backward flow.

The power management server 200 and facility 300 are connected to a network 120. The network 120 should provide a channel between the power management server 200 and facility 300. For example, the network 120 may be an internet. The network 120 may be a leased channel such as a VPN (Virtual Private Network) or the like.

The power management server 200 is a server managed by a power company such as a power generation company, a power transmission and distribution company, a retailer, a resource aggregator, or the like. The resource aggregator is the power company that undertakes power management of the power grid 110 to the power generation company, the power transmission and distribution company, the retailer, and so on, in a VPP (Virtual Power Plant). The power management of the power grid 110 includes power management of the power grid or the like. Detail of the power management server 200 will be explained in later (see, FIG. 4).

Here, the power management server 200 may transmit, to an EMS 320 provided in the facility 300, a control message indicating control to a distributed power supply provided in the facility 300. For example, the power management server 200 may transmit a flow control message requesting control of the flow (for example, DR; Demand Response). The power management server 200 may transmit a backward flow control message requesting control of the backward flow. The power management server 200 may transmit a power supply control message controlling an operation state of the distributed power supply. A control level of the flow or the backward flow may be represented by an absolute value (for example, ○○ kw), or a relative value (for example, ○○ %). The control level of the flow or the backward flow may be represented by a level equal or more than "2". The control level of the flow or the backward flow may be represented by an electric power charge (RTP; Real Time Pricing) determined by a current balance of the power supply and demand The control level of the flow or the backward flow may be represented by an electric power charge (TOU; Time Of Use) determined by a past balance of the power supply and demand The facility 300 includes a fuel cell system 310 and the EMS 320. The fuel cell system 310 includes an equipment performing power generation by using a fuel such as a gas or the like. Detail of the fuel cell system 310 will be explained in later (see, FIG. 2). The EMS 320 is an equipment (Emergency Management System) controlling an equipment provided in the facility 300.

The facility 300 may include a load equipment consuming electric power. The load equipment is an air conditioning equipment, a lighting equipment, an AV (Audio Visual) equipment, or the like, for example. The facility 300 may include a distributed power supply other than the fuel cell system 310. The distributed power supply may include an equipment performing power generation by utilizing natural energy such as solar light, wind power, geothermy, or the like. The distributed power supply may include a storage battery equipment.

In the embodiments, communication between the power management server 200 and EMS 320 may be performed according to a first protocol. On the other hand, communication between the EMS 320 and fuel cell system 310 may be performed according to a second protocol different to the first protocol. For example, as the first protocol, a protocol conforming to an Open ADR (Automated Demand Response) or a unique dedicated protocol can be used. For example, as the second protocol, a protocol conforming to an ECHONET Lite, SEP (Smart Energy Profile) 2.0, KNX, or a unique dedicated protocol can be used. Further, the first protocol is enough to be different from the second protocols, for example, both may be the unique dedicated protocol or a protocol made up different rules.

(Fuel Cell System)

Figure 2:
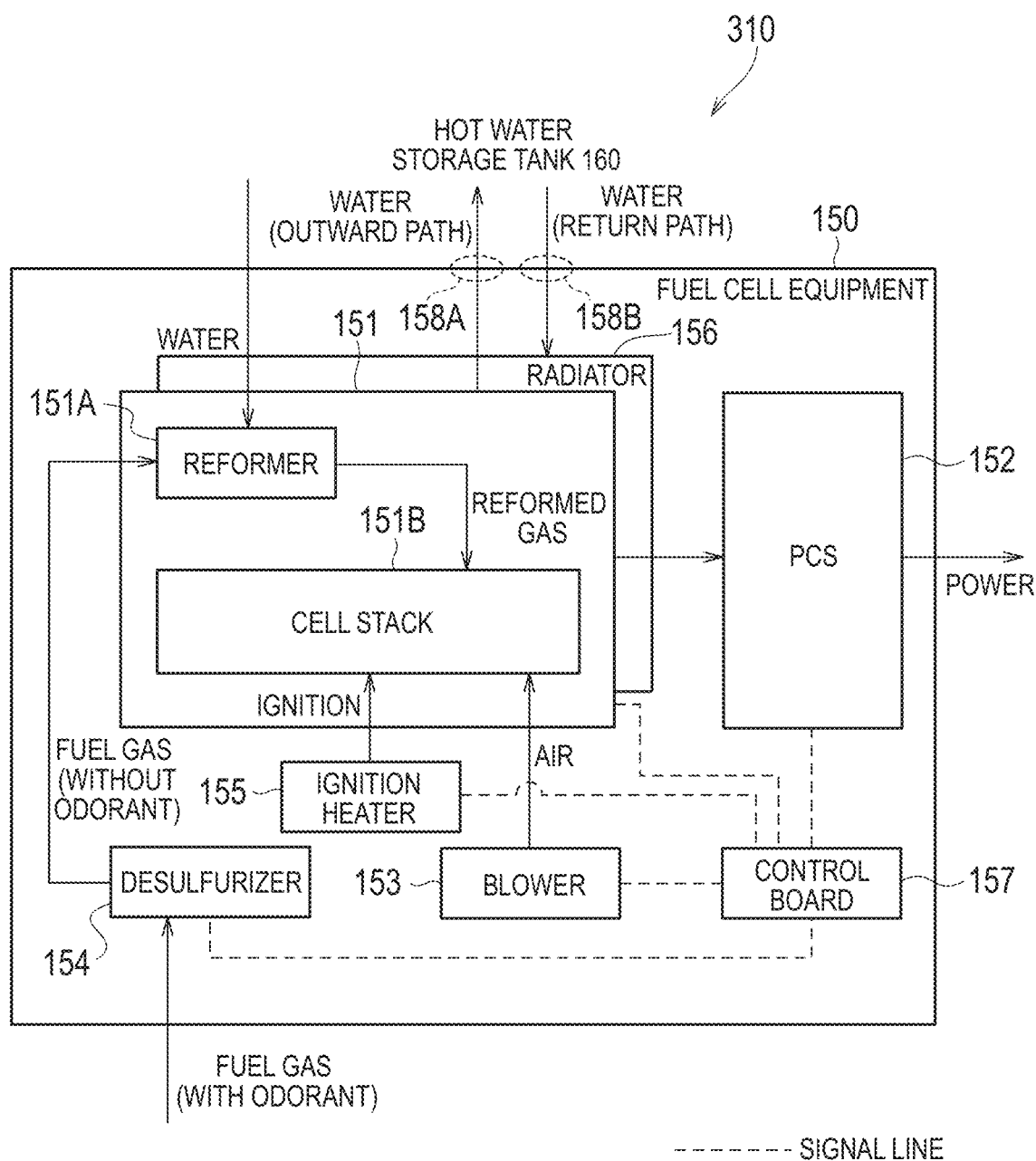
FIG. 2 is a diagram illustrating a fuel cell system 310 according to an embodiment.

In the following, it will be described about the fuel cell system according to the embodiments. FIG. 2 is a diagram illustrating the fuel cell system 310 according to the embodiments. The fuel cell system 310 includes a fuel cell equipment 150 at least. The fuel cell system 310 and a hot water storage tank 160 are installed together. Here, the fuel cell system 310 continues to be described as being a co-generation system which includes the fuel cell equipment 150 and is installed together with the hot water storage tank 160.

The fuel cell equipment 150 is an equipment performing power generation by using the fuel such as the gas or the like. Concretely, as illustrated in FIG. 2, the fuel cell equipment 150 includes a fuel cell 151, PCS 152, blower 153, desulfurizer 154, ignition heater 155, radiator 156, control board 157, heat exchange outlet 158A, and heat exchange inlet 158B.

The fuel cell 151 is an equipment performing power generation by using the fuel. Concretely, the fuel cell 151 includes a reformer 151A and cell stack 151B.

The reformer 151A generates a reformed gas from the fuel from which an odorant is removed, by the desulfurizer 154 described in later. The reformed gas is a gas composed of hydrogen and carbon monoxide.

The cell stack 151B generates electric power by a chemical reaction between air (oxygen) supplied from the blower 153 described in later and the reformed gas. Concretely, the cell stack 151B has a structure in which a plurality of cells is stacked. Each of cells has a structure in which an electrolyte is sandwiched between a fuel electrode and an air electrode. The reformed gas (hydrogen) is supplied to the fuel electrode and the air (oxygen) is supplied to the air electrode. In the electrolyte, a chemical reaction between the reformed gas (hydrogen) and the air (oxygen) occurs, and the electric power (DC electric power) and heat are generated.

The PCS 152 is an equipment (Power Conditioning System) converting the DC electric power output from the fuel cell 151 into AC electric power.

The blower 153 supplies the air to the fuel cell 151 (the cell stack 151B). The blower 153 is constituted of a fan, for example. The blower 153 cools the cell stack 151B so that temperature of the cell stack 151B does not exceed an upper limit of allowable temperature.

The desulfurizer 154 removes an odorant included in fuel supplied from outside. The fuel may be a town gas or a propane gas.

The ignition heater 155 is a heater igniting to the fuel (hereinafter, an unreacted fuel) which did not chemically react with the cell stack 151B and maintaining the temperature of the cell stack 151B at a high temperature. That is, the ignition heater 155 ignites to the unreacted fuel leaking from an opening port of each of cells constituting the cell stack 151B. It should be noted that the ignition heater 155 needs only to ignite to the unreacted fuel in a case where the unreacted fuel is not burning (for example, at startup of the fuel cell equipment 150). And, after burn of the unreacted gas is started, the temperature of the cell stack 151B is maintained at a high temperature, by that the unreacted fuel overflowing slightly from the cell stack 151B is continuing to burn.

The radiator 156 may cool the cell stack 151B so that the temperature of the cell stack 151B does not exceed the upper limit of the allowable temperature. Water (return path) may be cooled so that temperature of the water (return path) flowing from the hot water storage tank 160 to the fuel cell equipment 150 does not exceed the upper limit of the allowable temperature.

The control board 157 is a board on which a circuit controlling the fuel cell 151, PCS 152, blower 153, desulfurizer 154, ignition heater 155, and control board 157 is mounted.

The heat exchange outlet 158A is a port which leads water (also called water (outward path)) to the hot water storage tank 160. The heat exchange outlet 158A is connected to a recirculating pipe 161 described in later.

The heat exchange inlet 158B is a port which leads the water (also called the water (return path)) from the hot water storage tank 160. The heat exchange inlet 158B is connected to the recirculating pipe 162 described in later.

The reformer 151A, blower 153, desulfurizer 154, ignition heater 155, and control board 157 are examples of auxiliaries assisting an operation of the cell stack 151B. Also, a part of the PCS 152 may be treated as the auxiliaries.

Operation states of the fuel cell system 310 include a power generating state, a stopping state, a starting up state, a stop operating state, an idling state, or the like. For example, the operation state may be also called a power generation operation state in the ECHONET Lite.

The power generating state is a state in which power generation by the fuel cell 151 is being performed. The starting up state is a state leading from the stopping state to the power generating state. The stopping state is a state in which an operation of the fuel cell 151 is stopping. The stop operating state is a state leading from the power generating state to the stopping state. The idling state is a state in which the temperature of cell stack 151B is maintaining at a predetermined temperature though power does not be output from the fuel cell system 310. The predetermined temperature may be about the same as a power generation temperature (for example, 650° C.-1000° C.) of the cell stack 151B in the power generating state. The predetermined temperature may be a temperature (for example, 450° C.-600° C.) lower than the power generation temperature. In the idling state, powers of the auxiliaries may be covered by power output from the fuel cell 151. In the idling sate, the powers of the auxiliaries may be covered by power supplied from another distributed power supply (for example, an equipment or a storage battery equipment performing power generation by utilizing natural energy). In the idling state, the powers of the auxiliaries may be covered by power supplied from the power grid 110.

In the examples illustrated in FIG. 2, the control board 157 is installed in the fuel cell equipment 150. However, the embodiments are not limited to this. The fuel cell system 310 includes a remote controller accepting a user operation and the control board 157 is installed in the remote controller. Or, functions of the control board 157 may be realized by both of a board installed in the fuel cell equipment 150 and the remote controller.

Figure 3:
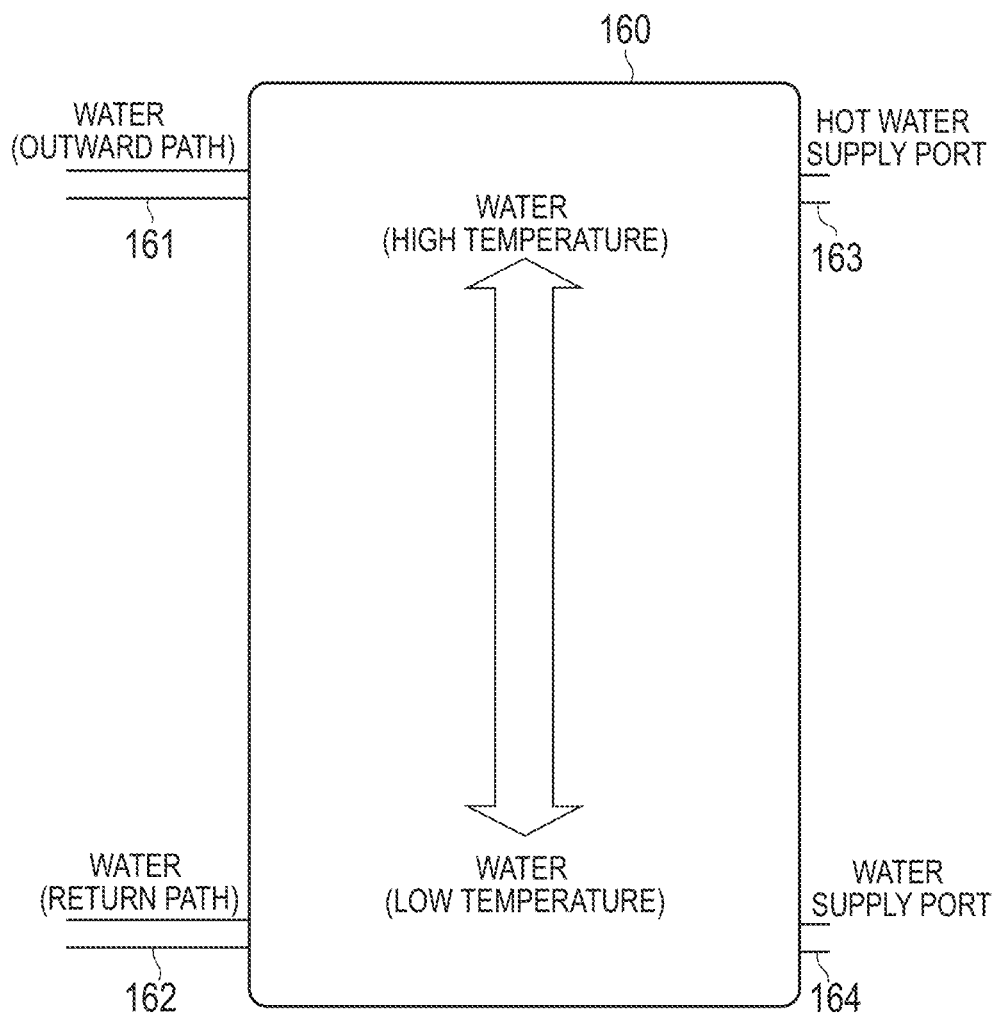
FIG. 3 is a diagram illustrating a hot water storage tank 160 according an embodiment.

The hot water storage tank 160 is connected to the fuel cell equipment 150 by the recirculating pipe 161 and a recirculating pipe 162, as illustrated in FIG. 2 and FIG. 3. The recirculating pipe 161 forms a flow path of the water (outward path) heated by exhaust heat of the fuel cell equipment 150. The recirculating pipe 162 forms a flow path of the water (return path) supplied from the hot water storage tank 160 to the fuel cell equipment 150. The hot water storage tank 160 includes a hot water supply port 163 and a water supply port 164. The hot water supply port 163 is a port for taking out hot water from the hot water storage tank 160. The water supply port 164 is a port for supplying water to the hot water storage tank 160. When the hot water is taken out from the hot water supply port 163, the water is supplied from the water supply port 164.

For example, as illustrated in FIG. 3, the recirculating pipe 161 and hot water supply port 163 are provided in an upper part of the hot water storage tank 160. Relatively high temperature of the water is stored at the upper part of the hot water storage tank 160. On the other hand, the recirculating pipe 162 and water supply port 164 are provided in a lower part of the hot water storage tank 160. Relatively low temperature of the water is stored in the lower part of the hot water storage tank 160.

In the embodiments, the control board 157 of the fuel cell equipment 150 includes a communication module. The control board 157 constitutes a communicator transmitting a message to the power management server 200. The control board 157 may transmit the message to the power management server 200 via the EMS 320. The control board 157 transmits a message including an information element indicating an operation state of the fuel cell system 310. The control board 157 may have a function performing communication with the hot water storage tank 160. The control board 157 may receive a message including an information element indicating amount of hot water or temperature of the hot water of the hot water storage tank 160. The control board 157 may not have the function performing the communication with the hot water storage tank 160.

(Power Management Server)

Figures 4, 5:
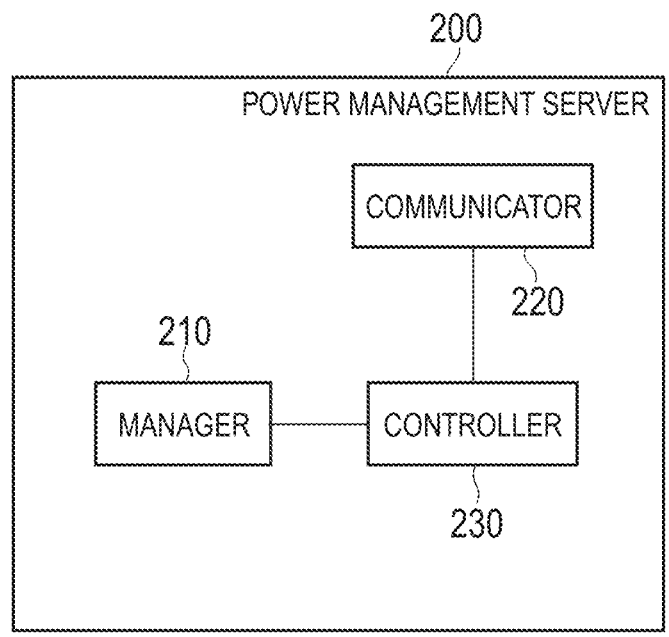
FIG. 4 is a diagram illustrating a power management server 200 according to an embodiment.
FIG. 5 is a diagram illustrating an information element according to an embodiment.

In the following, it will be explained about the power management server according to the embodiments. As illustrated in FIG. 4, the power management server 200 includes a manager 210, communicator 220, and controller 230. The power management server 200 is an example of a VTN (Virtual Top Node).

The manager 210 is constituted by a storage medium such as a nonvolatile memory and/or HDD. The manager 210 stores data regarding to the facility 300 managed by the power management server 200. The facility 300 managed by the power management server 200 may be the facility having a contract with a power company. For example, the data regarding to the facility 300 may be demand power supplied from the power grid 110 to the facility 300. The data regarding to the facility 300 may be a type of the fuel cell system 310 provided in the facility 300, spec of the fuel cell system 310 provided in the facility 300, or the like. The spec may be rated generation power (W) of the fuel cell system 310 or the like. Further, the data relating to the facility 300 may include capacity of the hot water storage tank 160.

The communicator 220 is constituted by a communication module. The communicator 220 performs communication with the EMS 320 via the network 120. The communicator 220 performs communication according to a first protocol, as described above. For example, the communicator 220 transmits, to the EMS 320, a first message according to the first protocol. The communicator 220 receives, from the EMS 320, a first message response according to the first protocol. Here, the communicator 220 receives power generation amount data from the EMS 320. The communicator 220 may receive the power generation amount data from the EMS 320 periodically.

In the embodiments, the communicator 220 receives, from the fuel cell system 310, a message including an information element indicating an operation state. The communicator 220 may receive, from the fuel cell system 310 via the EMS 320, the message including the information element indicating the operation state.

As illustrated in FIG. 5, the information element indicating the operation state is an information element indicating any one of a power generating state, stopping state, starting up state, stop operating state, and idling state. Details of each of the operation states are as described above.

The controller 230 is constituted by a memory, CPU (Central Processing Unit), and so on. The controller 230 may be constituted by at least one processor. The controller 230 controls each of configurations installed in the power management server 200. For example, the controller 230 indicates a control to the fuel cell system 310 provided in the facility 300, to the EMS 320 provided in the facility 300, by transmission of a control message. The control message may be the flow control message, backward flow control message, or power supply control message, as described above.

In the embodiments, firstly, the controller 230 controls the fuel cell system 310 in which the operation state is the power generating state, in preference to the fuel cell system 310 in which the operation sate is the starting up sate, stopping state, and stop operating state, in a control target period for controlling the fuel cell system 310.

Here, the control target period is a period in which a power demand of the facility 300 needs to be reduced, due to factors such as tight balance of power demand and supply or the like. The control target period may be a period controlled by the VPP. The control target period may be a period controlled by the DR.

Secondly, the controller 230 may control the fuel cell system 310 in which the operation sate is the starting up state, in preference to the fuel cell system 310 in which the operation state is the stopping state and stop operating state, in the control target period. In such the case, the controller 230 may controls the fuel cell system 310 which temperature of a power generator is equal to or more than a threshold value, in preference to the fuel cell system 310 which the temperature of the power generator (here, the cell stack 151B) is lower than the threshold value, out of the fuel cell system 310 in which the operation state is the starting up state, in the control target period. Thereby, the controller 230 can control in preference from the fuel cell system 310 which can reach the power generating state more quickly, in a case of comparing with a plurality of fuel cell systems 310 which is the same starting up state.

Thirdly, the controller 230 may control the fuel cell system 310 in which the operating state is the stopping state, in preference to the fuel cell system 310 in which the operating state is the stop operating state, in the control target period.

As described above, priority order of the fuel cell system 310 to increase output power is determined in order of the power generating state, starting up state, stopping state, and stop operating state.

Here, as the operation state, four states of the power generating state, stopping state, starting up state, and stop operating state is exemplified, however it is not limited to this in the embodiments. As described above, the operating state may include the idling state in addition to the above four states. In such the case, priority order of the fuel cell system 310 being the idling state may be treated as the same as priority order of the fuel cell system 310 which is the power generating state. The priority order of the fuel cell system 310 being the idling state may be lower than the priority order of the fuel cell system 310 being the power generating state. The priority order of the fuel cell system 310 being the idling state may be higher than the priority order of the fuel cell system 310 being the starting up state.

(Power Management Method)

In the following, it will be a power management method according to the embodiments. In FIG. 6, it is assumed as a case that there is a need to increase power output of the fuel cell system 310, due to factors such as tight balance of power demand and supply of the power grid 110 or the like. In FIG. 6, one of the fuel cell system 310 is exemplified, however two or more of the fuel cell systems 310 are existed, as illustrated in FIG. 1.

As illustrated in FIG. 6, in the step S11, the fuel cell system 310 transmits, to the power management server 200, a message including an information element indicating an operating state. The fuel cell system 310 may transmit, to the power management server 200, the message including the information element indicating the operating state, periodically. The information element is as illustrated in FIG. 5.

In step S12, the power management server 200 selects the fuel cell system 310 to increase output power, based on the information element indicating the operating state. For example, the power management server 200 selects, based on priority order, the fuel cell system 310 which is necessary to resolve tight balance of power supply and demand of the power grid 110. The priority order of the fuel cell system 310 to increase the output power is determined in order of a power generating state (idling state), starting up state, stopping state, and stop operating state.

In step S13, the power management server 200 transmits, to the fuel cell system 310, a control message for controlling the fuel cell system 310, based on the selection result. For example, the power management server 200 transmits a control message indicating increase of output power of the fuel cell system 310 which the priority order is high.

(Operation and Effect)

In the embodiments, the power management server 200 selects the fuel cell system 310 to increase the output power based on the information element indicating the operation state. The priority order of the fuel cell system 310 to increase the output power is determined in order of the power generating state (idling state), starting up state, stopping state, and stop operating state. According to the configuration, it is possible to select the fuel cell system 310 which contributes to solve tight balance of power demand and supply of the power grid 110 quickly.

[First Modification]

In the following, it will be explained about a first modification of the embodiments. In the following, it will be explained about difference point of the embodiments.

In the first modification, the fuel cell system 310 may transmit a message including an information element indicating a number of stops of the fuel cell system 310. The fuel cell system 310 may transmit a message including an information element indicating a type of stop of the fuel cell system 310. In other words, the power management server 200 may receive, from the fuel cell system 310, the message including the information element indicating the number of stops of the fuel cell system 310. The power management server 200 may receive, from the fuel cell system 310, the message including the information element indicating the type of the stop of the fuel cell system 310.

For example, the type of stop includes a normal stop and abnormal stop. The normal stop is an operation of stopping an operation of the fuel cell system 310 while lowering the temperature of the cell stack 151B by using the blower 153 or the radiator 156, though stopping the power generation by the fuel cell 151, without stopping the blower 153 or the radiator 156. On the other hand, the abnormal stop is an operation of stopping not only the power generation of the fuel cell 151 but also a whole operation of the fuel cell system 310. The normal stop is an operation which is executed according to relatively slight abnormality or operation which is executed in periodic maintenance of the fuel cell system 310, for example. On the other hand, the abnormal stop is an operation which is executed according to the relative serious abnormality or operation which is executed in a state that the normal stop cannot be performed, for example.

Further, the stop of the fuel cell system 310 includes a manual stop and automatic stop. The manually stop is a stop caused by a user's operation. The automatic stop is a stop caused by a stop function included in the fuel cell system 310. The automatic stop is an automatic stop by the fuel cell system 310 without performing the user's operation. The manual stop includes the above described normal stop and abnormal stop. Similarly, the automatic stop includes the above described normal stop and abnormal stop. Further, the stop of the fuel cell system 310 may include an operation (that is, the above described remote stop) of stopping the fuel cell system 310 by a remote operation from the power management server 200. Such the operation may be counted as the manual stop, or as the automatic stop.

The abnormal stop may be a stop which is executed according to an event in which gas concentration in the fuel cell system 310 is out of predetermined range, for example. The abnormal stop may be a stop which is executed according to an event in which concentration of CO in the fuel cell system 310 exceeds an upper threshold value. The abnormal stop may be a stop which is executed according to an event (high temperature abnormality) in which temperature of components (cell stack, fuel catalyst, or the like) installed in the fuel cell system 310 exceeds an upper threshold value. The concentration of gas, the concentration of CO, and the temperature of components may be detected by a sensor installed in the fuel cell system 310. The abnormal stop may be an automatic stop which the fuel cell system 310 stops automatically by detection results of the sensor. The abnormal stop may be a manual stop which the fuel cell system 310 stops by the user's operation, by notifying the detection result of the sensor to a user. Further, the abnormal stop may be a stop which is executed according to abnormality of the component (for example, the sensor, blower 153, radiator 156, or the like) installed in the fuel cell system 310, for example. The abnormal stop may be an automatic stop which the fuel cell system 310 stops automatically by the detection result of the abnormality of the component. The abnormal stop may be a manual stop which the fuel cell system 310 stops by the user's operation by notifying the detection result of the abnormality of the component to the user.

The normal stop is a stop other than the abnormal stop. The normal stop may be a stop which is executed according to an event (low temperature abnormality) that temperature of the component (cell stack or the like) installed in the fuel cell system 310 falls below a lower threshold value, for example. The temperature of the component may be detected by the sensor installed in the fuel cell system 310. The normal stop may be the automatic stop which the fuel cell system 310 stops automatically by the detection result of the sensor. The normal stop may be the manual stop which the fuel cell system 310 stops by the user's operation by notifying the detection result of the sensor to the user. Further, the normal stop may be a stop which is executed according to communication abnormality. The communication abnormality may be a communication abnormality between the components installed in the fuel cell system 310, such as the PCS 152, control board 157, remote controller, and so on. The communication abnormality may be a communication abnormality between the fuel cell system 310 and EMS 320. The communication abnormality may be abnormality which a state that communication is not available continues more than a predetermined period of time. The normal stop may be an automatic stop which the fuel cell system 310 stops automatically based on the detection result of the communication abnormality. The normal stop is a manual stop which the fuel cell system 310 stops by the user's operation, by notifying the detection result of the communication abnormality to the user. The normal stop may be a stop which is executed according to abnormality of the power grid 110. The abnormality of the power grid 110 may be a blackout, or abnormality of a grid voltage and grid frequency. The normal stop may be an automatic stop which the fuel cell system 310 stops automatically by a detection result of abnormality of the power grid 110. The normal stop may be a manual stop which the fuel cell system 310 stops by the user's operation by notifying the detection result of abnormality of the power grid 110 to the user.

The number of stops may be a number of normal stops, a number of abnormal stops, or a total number of the normal stop and abnormal stop. Further, the number of stops may be a distinguishable number from the automatic stop and manual stop.

In such the case, the power management server 200 may control the fuel cell system based on the number of stops, in the fuel cell system in which the operation state is the stopping state and stop operating state, at the control target period. For example, the power management server 200 may control a fuel cell system which the number of stops is lower than a predetermined threshold value, in preference to the fuel cell system 310 which the number of stops is equal to or more than the predetermined threshold value.

Further, the power management server 200 may control the fuel cell system based on the number of stops and a type of stop. For example, the power management server 200 may control a fuel cell system which a number of abnormal stops is lower than a predetermined threshold value, in preference to the fuel cell system 310 which the number of the abnormal stops is equal to or more than the predetermined threshold value. Further, the power management server 200 may control a fuel cell system which a number of normal stops is lower than a predetermined threshold value, in preference to the fuel cell system 310 which the number of normal stops is equal to or more than the predetermined threshold value, out of the fuel cell system 310 which the number of abnormal stops is equal to or more than the predetermined threshold value.

(Operation and Effect)

In the embodiments, the power management server 200 selects the fuel cell system 310 to increase the output power based on the information element indicating the number of stops (and type of stop). Such the configuration, when a case where an upper of the number of stops is determined in the fuel cell system 310 is assumed, it is possible to select the fuel cell system 310 to increase the output power properly, while possibility that the number of stops reaches the upper is reduced.

[Other Embodiment]

Though the present invention is described by the above embodiments, the description and drawings being a part of disclosure should not be understood to limit the present invention. By this disclosure, various alternate embodiments, examples, and operating techniques will become apparent for a person with an ordinary skill in the art.

In the embodiments, the fuel cell system 310 which the temperature of the power generator is equal to or more than a predetermined value is controlled, in preference to the fuel cell system 310 which the temperature of the power generator is lower than the predetermined threshold value, under a case where the fuel cell system 310 is a type of performing power generation by rising temperature of the power generator is assumed. However, the embodiments should not be limited to this. In a case where the fuel cell system 310 is a type of performing the power generation by lowering temperature of the power generator, the fuel cell system 310 which the temperature of the power generator is less than a threshold value may be controlled, in preference to the fuel cell system 310 which the temperature of the power generator is higher than the threshold value.

In the embodiments, though the manager 210 is installed in the power management server 200, the embodiments are not limited to this. For example, the manager 210 may be installed in a server connected to the power management server 200 via the network 120.

The fuel cell equipment 150 is a solid oxide fuel cell (SOFC: Solid Oxide Fuel Cell). However, the fuel cell equipment 150 may be a polymer electrolyte fuel cell (PEFC: Polymer Electrolyte Fuel Cell), a phosphoric acid fuel cell (PAFC: Phosphoric Acid Fuel Cell), or a molten carbonate fuel cell (MCFC: Molten Carbonate Fuel Cell).

In the embodiments, it is exemplified that the first protocol is a protocol conforming to the Open ADR 2.0, and the second protocol is a protocol conforming to the ECHONET Lite. However, the embodiments are not limited to this. The first protocol may be a protocol standardized as a protocol used in communication between the power management server 200 and EMS 320. The second protocol may be a protocol standardized as a protocol used in the facility 300.

This application claims priority to Japanese application publication No. 2018-121627 (filed on Jun. 27, 2018), which is incorporated by reference herein in their entity.

The invention claimed is:

1. A power management server configured to control a plurality of fuel cell systems each including a power generator, the power management server comprising:
at least one processor, wherein
the at least one processor is configured to receive a first message including a first information element indicating an operation state of each of the plurality of the fuel cell systems,
select a fuel cell system from the plurality of fuel cell systems, as a distributed power supply of a VPP (Virtual Power Plant), and
control the selected fuel cell system as the distributed power supply of the VPP in a control target period for controlling the plurality of fuel cell systems, and
wherein the at least one processor is configured to select, as the distributed power supply of the VPP, a fuel cell system of which the operation state is a power generating state, in preference to a fuel cell system of which the operation state is a starting up state, a stopping state, or a stop operating state.

2. The power management server according to claim 1, wherein
the at least one processor is configured to select, as the distributed power supply of the VPP, the fuel cell system of which the operating state is the starting up state, in preference to the fuel cell system of which the operating state is the stopping state or the stop operating state.

3. The power management server according to claim 2, wherein
the at least one processor is configured to select, as the distributed power supply of the VPP, a fuel cell system of which temperature of the power generator is equal to or more than a threshold value, in preference to a fuel cell system of which the temperature of the power generator is less than the threshold value, out of the fuel cell system of which the operating state is the starting up state.

4. The power management server according to claim 1, wherein
the at least one processor is configured to select, as the distributed power supply of the VPP, the fuel cell system of which the operation state is the stopping state, in preference to the fuel cell system of which the operation state is the stop operating state.

5. The power management server according to claim 1, wherein
the at least one processor is configured to
receive a second message including a second information element indicating a number of stops of each of the plurality of fuel cell systems, and
select, as the distributed power supply of the VPP, a fuel cell system based on the number of stops, in the plurality of fuel cell systems of which the operation state is the stopping state or the stop operating state.

6. The power management server according to claim 5, wherein
the at least one processor is configured to
receive a third message including a third information element indicating a type of stop of each of the plurality of fuel cell systems, and
select, as the distributed power supply of the VPP, a fuel cell system based on the number of stops and the type of stop, in the plurality of fuel cell systems of which the operation state is the stopping state or the stop operating state.

7. A power management system comprising:
each of a plurality of fuel cell systems each including a power generator; and
a power management server configured to control the plurality of the fuel cell systems, wherein
the power management server includes at least one processor,
the at least one processor is configured to
receive a message including an information element indicating an operation state of each of the plurality of the fuel cell systems,
select a fuel cell system from the plurality of fuel cell systems, as a distributed power supply of a VPP (Virtual Power Plant), and
control the selected fuel cell system as the distributed power supply of the VPP in a control target period for controlling the plurality of fuel cell systems, and wherein the at least one processor is configured to select, as the distributed power supply of the VPP, a fuel cell system of which the operation state is a power generating state, in preference to a fuel cell system of which the operation state is a starting up state, a stopping sate, or a stop operating state.

8. A power management method that a power management server controls a plurality of fuel cell systems each including a power generator, the power management method comprising:

receiving a message including an information element indicating an operation state of each of the plurality of the fuel cell systems, by the power management server; and selecting a fuel cell system from the plurality of fuel cell systems, as a distributed power supply of a VPP (Virtual Power Plant); and controlling the selected fuel cell system as the distributed power supply of the VPP in a control target period for controlling the plurality of fuel cell systems, and wherein a fuel cell system of which the operation state is a power generating state, is selected as the distributed power supply of the VPP, in preference to a fuel cell system of which the operating state is a starting up state, a stopping state, or a stop operating state.

* * * * *